(12) United States Patent
Boghossian et al.

(10) Patent No.: US 9,604,436 B2
(45) Date of Patent: Mar. 28, 2017

(54) THERMOPLASTIC POLYURETHANE INTERLAYER

(71) Applicant: PPG INDUSTRIES OHIO, INC., Pittsburgh, PA (US)

(72) Inventors: Razmik Boghossian, Porter Ranch, CA (US); Khushroo H. Lakdawala, Santa Clarita, CA (US)

(73) Assignee: PPG Industries Ohio, Inc., Pittsburgh, PA (US)

( * ) Notice: Subject to any disclaimer, the term of this patent is extended or adjusted under 35 U.S.C. 154(b) by 28 days.

(21) Appl. No.: 14/602,008

(22) Filed: Jan. 21, 2015

(65) Prior Publication Data

US 2015/0132580 A1 May 14, 2015

Related U.S. Application Data

(62) Division of application No. 13/691,633, filed on Nov. 30, 2012, now Pat. No. 8,956,728.

(51) Int. Cl.
*B32B 27/40* (2006.01)
*B32B 17/10* (2006.01)
(Continued)

(52) U.S. Cl.
CPC .......... *B32B 27/40* (2013.01); *B32B 17/1077* (2013.01); *B32B 27/08* (2013.01); *B32B 27/308* (2013.01); *B32B 27/365* (2013.01); *C08G 18/06* (2013.01); *C08G 18/3206* (2013.01); *C08G 18/4018* (2013.01); *C08G 18/42* (2013.01);
(Continued)

(58) Field of Classification Search
CPC C08G 18/06; C08G 18/3206; C08G 18/4248; C08G 18/4018; C08G 18/73; C08G 18/74; C08G 18/76; B32B 17/1077; B32B 27/08; B32B 27/40; B32B 27/308; B32B 27/365; B32B 2307/412; B32B 2307/558; B32B 2307/734; B32B 2571/02; B32B 2605/006; Y10T 156/10; Y10T 156/31507; Y10T 156/31551; Y10T 156/31554;
(Continued)

(56) References Cited

U.S. PATENT DOCUMENTS 3,764,457 A 10/1973 Chang et al.
3,900,655 A 8/1975 Wolgemuth et al.
(Continued)

FOREIGN PATENT DOCUMENTS

EP 0 327 031 A2 8/1989
WO WO 2007/041049 A1 4/2007

OTHER PUBLICATIONS

International Search Report and Written Opinion of the International Searching Authority, dated Dec. 16, 2013, issued in PCT/US2013/056774 (9 pages).

*Primary Examiner* — Thao T Tran
(74) *Attorney, Agent, or Firm* — Lewis Roca Rothgerber Christie LLP

(57) ABSTRACT

A composition includes an isocyanate, a polyether diol, a branched short chain diol having a backbone including carbon atoms in a range of 1 to 9 and at least one branching group, and a cross-linker having a hydroxyl functionality in a range of 2.2 to 4. A films includes the composition and an interlayer includes the film. Transparencies including the interlayer and methods of making the same are further disclosed.

12 Claims, 7 Drawing Sheets

(51) Int. Cl.
| | |
|---|---|
| *B32B 27/08* | (2006.01) |
| *B32B 27/36* | (2006.01) |
| *C08G 18/32* | (2006.01) |
| *C08G 18/06* | (2006.01) |
| *C08G 18/40* | (2006.01) |
| *B32B 27/30* | (2006.01) |
| *C08G 18/73* | (2006.01) |
| *C08G 18/74* | (2006.01) |
| *C08G 18/76* | (2006.01) |
| *C08G 18/42* | (2006.01) |
| *C08G 18/48* | (2006.01) |

(52) U.S. Cl.
CPC ............ *C08G 18/48* (2013.01); *C08G 18/73* (2013.01); *C08G 18/74* (2013.01); *C08G 18/76* (2013.01); *B32B 2307/412* (2013.01); *B32B 2307/558* (2013.01); *B32B 2307/734* (2013.01); *B32B 2571/02* (2013.01); *B32B 2605/006* (2013.01); *Y10T 156/10* (2015.01); *Y10T 428/31507* (2015.04); *Y10T 428/31551* (2015.04); *Y10T 428/31554* (2015.04); *Y10T 428/31573* (2015.04); *Y10T 428/31576* (2015.04); *Y10T 428/31601* (2015.04)

(58) Field of Classification Search
CPC ..... Y10T 156/31573; Y10T 156/31576; Y10T 156/31601
USPC ........ 428/423.1, 423.3, 424.4, 425.6; 528/76
See application file for complete search history.

(56) References Cited

U.S. PATENT DOCUMENTS

| | | | |
|---|---|---|---|
| 4,041,208 | A | 8/1977 | Seeger et al. |
| 4,241,140 | A | 12/1980 | Ammons |
| 4,444,846 | A | 4/1984 | Zalucha et al. |
| 4,592,947 | A | 6/1986 | Hunter et al. |
| 4,666,758 | A | 5/1987 | Hunter et al. |
| 4,784,916 | A * | 11/1988 | Bravet et al. .............. 428/423.1 |
| 6,900,260 | B1 * | 5/2005 | Mangels et al. .............. 524/366 |
| 7,166,649 | B2 | 1/2007 | Day et al. |
| 2009/0280329 | A1 | 11/2009 | Rukavina et al. |

* cited by examiner

Related Art

THERMOPLASTIC POLYURETHANE INTERLAYER

CROSS REFERENCE TO RELATED APPLICATION(S)

This application claims priority to and the benefit of, and is a divisional of U.S. application Ser. No. 13/691,633, titled THERMOPLASTIC POLYURETHANE INTERLAYER, filed Nov. 30, 2012, now issued as U.S. Pat. No. 8,956,728, the entire content of which is incorporated herein by reference.

TECHNICAL FIELD

Aspects of embodiments of the present invention are directed a composition including a polyether polyol, a low molecular weight polyester polyol and an isocyanate. The composition can be used to make a film, which can be used as an interlayer. The interlayer can be laminated onto a substrate, or between two or more substrates, to form, for example, a transparency (e.g., a canopy, windshield or window).

BACKGROUND

Thermoplastic polyurethanes ("TPUs") are typically formed from the reaction diisocyanates with either short chain or long chain diols. The reaction results in a polymer with block polymeric structure having soft segments and hard segments. The soft segments include lower polarity segments that are rather long and the hard segments include higher polarity segments that are rather short. Both segments are linked together covalently to form block co-polymers. The alternating structure of soft and hard segments allows for crystalline or pseudo-crystalline areas to be located in a soft and flexible matrix. TPU systems can be used to form interlayers useful in various applications, such as commercial and military aircraft transparencies (e.g., windshields, windows, and canopies), transportation (e.g., bus and train windows and windshields), transparent armor (e.g., ballistic glass), windows of buildings (e.g., bank, jewelry store, jail and prison windows), safety (e.g., police shields and visors), and other security applications. The foregoing applications benefit from interlayers that, when combined with a transparent, rigid substrate, provide a transparency having clarity, flexibility and low haze.

When TPU interlayer systems are made using short chain linear diols, the hard segment component (e.g., the total amount of the short chain diols and isocyanate content) of a typical TPU system (e.g., a polymer produced from polyether polyol, butane diol, ethylene glycol, and isocyanate) is limited to a maximum of 40 to 45 wt % of the TPU. For example, a typical amount of the short chain diol would be about 8 wt %. When the hard segment of such short chain TPU systems is greater than 40 to 45%, the resulting TPU interlayers become hazy and their transparency characteristics deteriorate.

Some commercial interlayers have also been made from polyester-based polyurethanes (i.e., polyurethane polymers made from polyols that include polyester polyols but do not include polyether polyols). These interlayers exhibit some acceptable and satisfactory performance characteristics, but those performance characteristics tend to deteriorate under humid and/or wet environmental conditions. Another problem associated with polyester based polyurethanes is the haze and loss of light transmittance that results from laminating multiple plies of polyurethane interlayers. For example, polyester-based polyurethanes tend to exhibit poor hydrolytic stability. Additionally, polyether-based polyurethanes (i.e., polyurethane polymers made from polyols that include polyether polyols but do not include polyester polyols) exhibit poor performance at lower temperatures (e.g., temperatures in a range of about −45° F. to about −20° F.).

Polyvinyl butyrate ("PVB") sheets have also been used as interlayers in aerospace applications. Many aircraft transparencies have included glass substrates and one or more vinyl (e.g., PVB) interlayers. Vinyl has a good performance record, is commercially available in good quality, and has cost and processing advantages over castable silicones and urethanes. However, vinyl has several shortcomings, such as poor properties at temperatures exceeding 150° F., it becomes very brittle at temperatures below 30° F., it has poor resistance to bird impact if the temperature is too low or too high, it can pull glass chips or cause delamination (particularly upon exposure to cold temperatures; e.g., −40° F. to −80° F.), and it is not compatible with polycarbonate.

With the advent of new specifications requiring improved bird impact performance, new design concepts have been evaluated that utilize polycarbonate and acrylic substrates in place of glass substrates. However, vinyl interlayers are unsuitable for use with polycarbonate, as the plasticizers included in the vinyl attack the polycarbonate. Nonetheless, PVB is still being used in aircraft canopy applications in a lesser amount. PVB interlayers are also still being used in automotive window applications and other safety related markets.

SUMMARY

Aspects of embodiments of the present invention are directed to a composition (e.g., a thermoplastic polyurethane) including polyether polyols and low molecular weight polyester polyols. For example, in one embodiment, a composition includes an isocyanate, a polyether polyol, and a low molecular weight polyester polyol having a weight average molecular weight in a range of about 200 g/mol to about 1000 g/mol. In some embodiments, the low molecular weight polyester polyol has a weight average molecular weight in a range of about 400 g/mol to about 600 g/mol. For example, the low molecular weight polyester polyol can have a weight average molecular weight in a range of about 460 g/mol to about 520 g/mol. In some embodiments, the polyether polyol has a weight average molecular weight in a range of about 250 g/mol to about 2900 g/mol.

In some embodiments, the low molecular weight polyester polyol can be an low molecular weight aliphatic or aromatic polyester diol. In some embodiments, the low molecular weight polyester polyol has a functionality in a range of about 2 to about 2.7 (e.g., a functionality greater than 2.0 and less than 2.7). For example, the low molecular weight polyester polyol can be a low molecular weight aliphatic or aromatic polyester polyol having a functionality in a range of about 2 to about 2.7 (e.g., a functionality greater than 2.0 and less than 2.7).

In some embodiments, the polyether polyol is an aliphatic or aromatic polyether diol.

According to other embodiments of the invention, an interlayer includes a composition including an isocyanate, a polyether polyol, and a low molecular weight polyester polyol having a weight average molecular weight in a range of about 200 g/mol to about 1000 g/mol.

According to still other embodiments of the invention, a transparency includes a transparent, rigid substrate and an interlayer on the transparent, rigid substrate, the interlayer including an isocyanate, a polyether polyol, and a low molecular weight polyester polyol having a weight average molecular weight in a range of about 200 g/mol to about 1000 g/mol. In some embodiments, the transparent, rigid substrate includes a material selected from the group consisting of glasses, polycarbonates, acrylics (e.g., casted or stretched acrylics) and polyurethanes. The transparency can further include a primer layer between the interlayer and the transparent, rigid substrate.

In some embodiments, the transparency further includes a second transparent, rigid substrate, and the interlayer is between the transparent, rigid substrate and the second transparent, rigid substrate. In some embodiments, the transparent, rigid substrate includes a first material, the second transparent, rigid substrate includes a second material, and the first material is different from the second material. The transparency can further include a primer layer between the interlayer and the second transparent, rigid substrate.

Embodiments of the invention include a method of making a transparency, the method including laminating an interlayer onto a transparent, rigid substrate, the interlayer including a composition including an isocyanate, a polyether polyol, and a low molecular weight polyester polyol having a weight average molecular weight in a range of about 200 g/mol to about 1000 g/mol. The method further includes heating the laminated interlayer under pressure. In some embodiments, the method further includes applying a primer layer onto the transparent, rigid substrate or the interlayer prior to laminating the interlayer onto the transparent, rigid substrate.

The method can also further include laminating a second transparent, rigid substrate onto the interlayer to position the interlayer between the transparent, rigid substrate and the second transparent, rigid substrate prior to heating, and then heating the laminated interlayer under pressure. In some embodiments, the method further includes applying a primer layer onto the second transparent, rigid substrate or the interlayer prior to laminating the second transparent, rigid substrate onto the interlayer.

According to other embodiments of the invention, a composition includes an isocyanate, a polyether diol, a branched short chain diol having a backbone including carbon atoms in a range of 2 to 9 and 1 to 4 branching or pendant groups, and a cross-linker having a hydroxyl functionality in a range of 3 to 4.

BRIEF DESCRIPTION OF THE DRAWINGS

These and other features and advantages of the present invention will be better understood by reference to the following detailed description when considered in conjunction with the accompanying drawings, in which.

DETAILED DESCRIPTION

Figure 1:
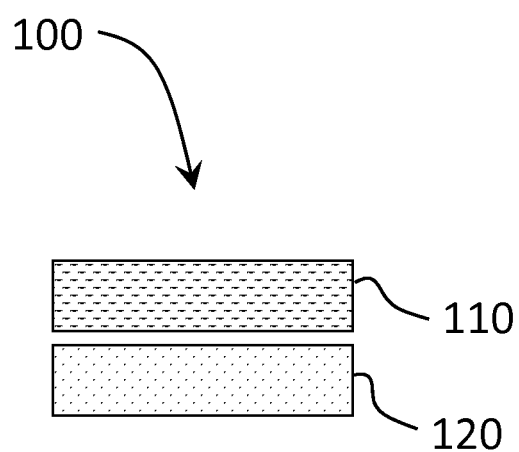
FIG. 1 is a partially exploded cross-sectional view of an embodiment of a transparency.

According to embodiments of the invention, a composition (e.g., a thermoplastic polyurethane or "TPU") includes an isocyanate, a polyether polyol, and a low molecular weight polyester polyol having a weight average molecular weight in a range of about 200 g/mol to about 1000 g/mol, for example, in a range of about 400 g/mol to about 600 g/mol or in a range of about 460 g/mol to about 520 g/mol. A film including the composition can have a glass transition temperature ("$T_g$") in a range of about 16° C. to about 33° C. When the film is used an interlayer on a substrate (or between substrates), the interlayer can maintain adhesion to a variety of substrates even at extreme temperatures. By incorporating a polyether polyol and a low molecular weight polyester polyol into the composition, the resulting interlayer has properties, such as humidity resistance, high temperature performance, resistance to damage from impact, and adhesion, that are improved relative to interlayers including TPU systems that do not include both a polyester polyol and a polyether polyol, i.e., systems that include only polyether or only polyether polyols.

As is known to those of skill in the art, conventional polyether and polyester polyol polymers are not compatible with each other in a polyurethane polymer backbone. See R. J. Ferrari, Urethane Elastomers A Comparison, Rubber Age 54 (February 1967). For example, conventional polyether and polyester polyol polymers are incompatible in a batch process where polyester and polyether polyols are charged together in a kettle and an isocyanate is added for a polyaddition reaction, such as reactive hot melt polyurethane synthesis. This incompatibility manifests itself through the formation of haze (e.g., formation of haze during the blending process or later during the curing of the polyurethane polymer) or other undesirable properties in the resultant polyurethane polymer. For example, the polyether polyol polymers conventionally used for making polyurethane polymers are not miscible (e.g., not compatible) with the polyester polyol polymers conventionally used for making polyurethane polymers. As a result, when a solution including a conventional polyether polyol polymer (e.g., a polyether polyol polymer conventionally used for making polyurethane polymers) is mixed with a solution including a conventional polyester polyol polymer (e.g., a polyester polyol polymer conventionally used for making polyurethane polymers), the resultant solution is turbid or poorly mixed, and the polyurethane polymer produced from the resultant solution will be heterogeneous and exhibit poor properties. Additionally, as the functionality of the polyether and/or polyester polyol polymers (e.g., the number of hydroxyl groups) increases, issues of gel formation during the synthesis of the polyurethane polymer may also arise.

Previously, attempts have been made to address the incompatibility of polyether and polyester polyol polymers in polyurethane polymers by: (1) polymerizing a first polyether (or polyester) polyol polymer with isocyanate, and then, during this process, adding and polymerizing a second polyester (or polyether) polyol polymer; or (2) using compatibilizer(s) during the mixing and polymerization stage. In the first approach (1), the procedure can be difficult to execute, since any delay or advance charging of the second polyol polymer may cause problems, and result in a polyurethane polymer having undesirable physical properties, such as low light transmittance. The second approach (2) can be problematic, since additional, and possibly undesirable, raw materials (i.e., the compatibilizers) are being introduced into the polyurethane polymer backbone.

In contrast to conventional polyurethane polymers, according to embodiments of the invention, a composition includes an isocyanate, a polyether polyol, and a low molecular weight polyester polyol having a weight average molecular weight in a range of about 200 g/mol to about 1000 g/mol. For example, the composition is formed by reacting the isocyanate, the polyether polyol and the low molecular weight polyester. Thus, the composition includes the isocyanate, polyether polyol and the low molecular weight polyester polyol in their reacted forms (e.g., reacted to form urethane, or carbamate, linkages).

By including a low molecular weight polyester polyol, embodiments of the composition can avoid or reduce the problems associated with the above-described incompatibility of polyether polyol polymers and polyester polyol polymers. The polyether polyols and low molecular weight polyester polyols according to embodiments of the present invention exhibit good compatibility across a broad temperature range (e.g., room temperature to about 200° F. provides a clear mixture before the isocyanate is added) when mixed in a liquid phase (e.g., a mixed solution). Embodiments of the composition exhibit acceptable clarity and flexibility at the cure stage, even when higher hard segment levels are included. Additionally, as described in more detail below, embodiments of a transparency including the composition described herein exhibit acceptable and satisfactory light transmittance and haze.

According to embodiments of the invention, the low molecular weight polyester polyol has a weight average molecular weight in a range of about 200 g/mol to about 1000 g/mol. For example, the low molecular weight polyester polyol can have a weight average molecular weight in a range of about 400 g/mol to about 600 g/mol. In some embodiments, the low molecular weight polyester polyol has a weight average molecular weight in a range of about 460 g/mol to about 520 g/mol. The low molecular weight polyester polyol can have a low $T_g$, such as a $T_g$ in a range of about −20° C. to about −32° C. Commercial examples of suitable low molecular weight polyester polyols include the K-FLEX polyols available from King Industries, Inc. (Norwalk, Conn.). For example, the low molecular weight polyester polyol can be the K-FLEX 188 polyol available from King Industries, Inc. Other examples of low molecular weight polyester polyols include K-FLEX XM-359 and K-FLEX XM-360, but the present application is not limited thereto. As used herein, the term "polyester polyol" refers to a compound having one or more ester functional groups and one or more reacted (e.g., reacted with an isocyanate functional group) or unreacted hydroxyl groups.

The low molecular weight polyester polyol can have a functionality in a range of about 2 to about 2.7 (e.g., a functionality greater than 2.0 and less than 2.7). For example, the low molecular weight polyester polyol can be a low molecular weight aliphatic or aromatic polyester polyol having functionality in a range of about 2 to about 2.7 (e.g., a functionality greater than 2.0 and less than 2.7). More than one low molecular weight polyester polyol can be used. For example, the composition can be made from a mixture of low molecular weight polyester polyols having several different weight average molecular weights. In some embodiments, the composition is made from a mixture of low molecular weight polyester polyols having several different glass transition temperatures.

According to embodiments of the invention, the polyether polyol has a weight average molecular weight in a range of about 250 g/mol to about 2900 g/mol. For example, the polyether polyol can have a weight average molecular weight in a range of about 650 g/mol to about 2000 g/mol, about 1000 g/mol to about 1800 g/mol, or about 1000 g/mol to about 1400 g/mol. The polyether polyol can be crystalline. One example of the polyether polyol includes polytetramethylene ether glycol ("PTMEG"). A commercial example of a polyether polyol includes TERATHANE® PTMEGs. TERATHANE® is a registered trademark of Invista North America S.A.R.L. (Wichita, Kans.). TERATHANE® PTMEGs are polyether glycols that can be used as soft segment building blocks for high performance polyurethanes and other polymers. TERATHANE® PTMEGs provide good dynamic properties and have low temperature flexibility and good hydrolytic stability. TERATHANE® PTMEGs are crystalline polyether diols that begin to freeze at room temperature and have a $T_g$ of about −86° F. Examples of the polyether polyol include TERATHANE® 1000, which is a blend of linear diols having the formula $HO(CH_2—CH_2—CH_2—CH_2—O—)_nH$ (where n is an average of 14), and TERATHANE® 2000, which is a blend of linear diols having the formula $HO(CH_2—CH_2—CH_2—CH_2—O—)_nH$ (where n is an average of 27), but the present application is not limited thereto. As used herein, the term "polyether polyol" refers to a compound having one or more ether functional groups and one or more reacted (e.g., reacted with an isocyanate functional group) or unreacted hydroxyl groups.

More than one polyether polyol can be used. The composition can be made from a mixture of polyether polyols having several different weight average molecular weights. In some embodiments, the composition is made from a mixture of polyether polyols having several different glass transition temperatures.

The isocyanate can be any suitable isocyanate, such as a diisocyanate. In some embodiments, the isocyanate has a molecular weight in a range of about 150 g/mol to about 600 g/mol. For example, the isocyanate can be any suitable compound having two or more isocyanate functional groups, i.e., the isocyanate can be selected from dimers, trimers, adducts, polymeric and low molecular weight isocyanates. The isocyanate can be added in an amount sufficient to provide a ratio of isocyanate functional groups to the hydroxyl groups of the polyether polyol and the low molecular weight polyester polyol in range of 1.01 to 1.10. The isocyanate can include aromatic isocyanates, aliphatic isocyanates or combinations thereof. The isocyanate can be a blocked isocyanate. In some embodiments, the isocyanate is one or more of an isocyanate represented by R—NCO and an isocyanate represented by OCN—R'—NCO, where each of R and R' independently includes an alkyl group, aromatic group or a combination thereof. Non-limiting examples of suitable aromatic isocyanates include toluene 2,4-diisocyanate, toluene 2,6-diisocyanate, 4,4'-methylene diphenyl diisocyanate, 2,4'-methylene diphenyl diisocyanate, polymeric methylene diisocyanate, p-phenylene diisocyanate, m-phenylene diisocyanate, naphthalene 1,5-diisocyanate, naphthalene 2,4-diisocyanate, 1,5-naphthalene diisocyanate, p-xylylene diisocyanate, and the like. Non-limiting examples of suitable aliphatic isocyanates include isophorone diisocyanate, 1,4-cyclohexane diisocyanate, 4,4'-dicyclohexylmethane diisocyanate, bi(isocyanatomethyl) cyclohexane, tetramethylxylylene diisocyanate, 1,6-hexamethylene diisocyanate, TMXDI® and the like. TMXDI® is a registered trademark of CYTEC Industries. Many of these isocyanates are commercially available from companies such as Bayer Corporation, BASF, ICI, Dow, Hunstman, CYTEC Industries, and Degussa. Aliphatic isocyanates may exhibit greater stability relative to other isocyanates when exposed to ultraviolet (UV) light. Thus, a composition including an aliphatic isocyanate may be desirable for applications that require UV stability. However, the present invention is not limited to aliphatic isocyanates.

As described above, the composition can include a combination of aliphatic isocyanates that are different from one another. By including more than one aliphatic isocyanate, the composition may have improved softness and flexibility. Additionally, a composition including more than one aliphatic isocyanate may have improved haze (e.g., lower haze readings) even when the composition includes a relatively higher percentage of hard segment. A composition including a combination of aliphatic isocyanates that are different from one another can also have improved adhesion (e.g., improved adhesion to one or more substrates) as a result of the presence of the isocyanates, which may be softer than the other components of the composition. Softer isocyanates, such as isophorone diisocyanate and/or TMXDI®, can be incorporated in combination with harder isocyanates, as the softer isocyanates have a tendency to improve adhesion and lower the haze reading at higher hard segment content. TMXDI® is a registered trademark of Cytec Technology Corp. (Wilmington, Del.).

Incorporation of a small amount of low molecular weight cross-linkers in the polyurethane polymer backbone will help to lower the haze values even by slightly increasing the initial charge amount. The composition according to embodiments of the invention can include any suitable degree of cross-linking by incorporation of low molecular weight species having a functionality of greater than 2.0. For example, the composition can be cross-linked to form a thermoset polyurethane polymer. Thermoset polyurethane polymers differ from thermoplastic polyurethane polymers in that irreversible cross-links are formed when the thermoset polyurethane polymer is cured. When the degree of cross-linking in the composition is low (e.g., less than about 1%), the composition may still exhibit the performance characteristics of a thermoplastic polyurethane polymer. The degree of cross-linking of the composition can be tailored to the intended application of the composition. The degree of cross-linking may need to be limited for certain applications, as exceeding a certain percentage of cross-linking may result in a composition having thermoset characteristics that inhibit the resultant composition's ability to be heat activated for processing. For example, when the composition is included in an interlayer and the cross-linking percentage of the composition exceeds a percentage of about 5%, the composition may not be capable of adhering to a substrate or substrates by way of heat lamination. Thus, when the composition is intended for use in an interlayer, the cross-linking percentage of the composition can be less than about 2.0%.

The degree of cross-linking of the composition can be controlled, for example, by controlling the amount of low molecular weight cross-linker included in the composition. For example, when the composition includes a polyether diol (e.g., a polyol including two hydroxyl groups), a low molecular weight polyester diol (e.g., a polyol including two hydroxyl groups) and a diisocyanate, the degree of cross-linking of the composition may be zero (i.e., the composition may be a linear polyurethane polymer, such as a linear thermoplastic polyurethane polymer). Such linear polyurethane polymers can be processed by, for example, injection molding, extrusion (after grinding), and thermoforming, but the present invention is not limited thereto. When the composition includes a polyether polyol, a low molecular weight polyester polyol, and/or isocyanate having three or more functional groups or low molecular weight cross-linkers (e.g., cross-linkers having or more hydroxyl groups or isocyanate groups), the composition has a degree of cross-linking greater than zero (i.e., cross-linking greater than 0%). The degree of cross-linking can be controlled by controlling the amount of low molecular weight cross-linkers having a functionality of greater than 2.0 that are included in the composition.

The composition can be formed using a catalyst. The catalyst promotes the reaction of isocyanate groups of the isocyanate with the hydroxyl groups of the polyether polyol and/or low molecular weight polyester polyol. The catalyst can be any catalyst suitable for catalyzing the reaction of the isocyanate with the polyether polyol and/or low molecular weight polyester polyol that does not result in a polyurethane polymer having undesirable properties (e.g., discoloration, haze or the like). Examples of the catalyst include tertiary amines, metal compound catalysts, and combinations thereof, but the present invention is not limited thereto. Non-limiting examples of suitable tertiary amine catalysts include triethylamine, N-methylmorpholine, triethylenediamine, pyridine, picoline, and the like. Non-limiting examples of suitable metal compound catalysts include compounds of lead, zinc, cobalt, titanate, iron, copper and tin. For example, the metal compound catalyst can be lead 2-ethylhexoate, zinc 2-ethylhexoate, cobalt naphthenate, tetraisopropyl titanate, iron naphthenate, copper naphthenate, dibutyl tin diacetate, dibutyl tin dioctate, dibutyl tin dilaurate, and the like. The catalyst can be included in an amount effective to promote the reaction of isocyanate groups of the isocyanate with the hydroxyl groups of the polyether polyol and/or low molecular weight polyester polyol. For example, the catalyst can be included in an amount in a range of about 0.01% to about 0.02%.

The low molecular weight polyester polyol can also be made using a catalyst. For example, the low molecular weight polyester polyols used in this embodiment can have an active catalyst present with the low molecular weight polyester polyol, which can also cause undesirable side reactions, such as association with UV additives during the synthesis of the composition (e.g., the polyurethane). For example, in the case of F-FLEX 188, when the polyaddition reaction was completed and all of the anti-oxidants and UV absorbers had been added, the batch turned into a dark yellow material. This discoloration was caused by complex and/or chelate formation of the additives (e.g., association of additives with one another), which was caused by the presence of the catalyst. Once the catalyst was removed and/or neutralized, the discoloration disappeared.

The composition can also be prepared using other additives, such as chain extenders, UV-absorbers, stabilizers, anti-oxidants, flow control agents, solvents and the like. Polyurethane polymers, such as the composition according to embodiments of the present invention, are susceptible to degradation caused by thermooxidative, thermal, or UV initiated degradation, the effects of which may be reduced or mitigated by a UV-absorber, or a stabilizer. Development of undesirable discoloration and reduction in mechanical properties are common issues that result from oxidative degradation of polyurethane polymers. In thermooxidation of a polyurethane polymer, the urethane group is relatively stable and the degradation starts at the polyether chain, for example, at the $CH_2$ group adjacent to or at the alpha position relative to the central linkage (e.g., the carbamate linkage). In aromatic-based polyurethanes, such as methylene diphenyl diisocyanate ("MDI"), the methylene bridge between the two aromatic rings of the MDI is also a point of photooxidative attack. In some instances, the oxidation of the polyurethane polymer may lead to a highly discolored and degraded polymer unless stabilizers are used.

Stabilizers can be added to the raw materials (e.g., incorporated into the compounds included in the raw materials) used to make the polyurethane polymer and/or stabilizers can be added as separate additives during the production of the polyurethane polymer. The stabilizers can include a reactive functional group, such as a hydroxyl group, to react with and chemically bond the stabilizers to the composition (e.g., the polyurethane polymer). In some embodiments, the stabilizers do not include a reactive functional group and/or do not react with and bond to the composition. The stabilizers can be added to reduce or retard the effect of thermooxidation of either the raw materials or the finished polyurethane polymer. For example, aliphatic-based polyurethane polymers are typically light-stable, but stabilizers may be necessary to reduce or retard the loss of mechanical properties. Examples of the stabilizers include any of the IRGANOX® antioxidants (available from BASF Corporation) and any hindered amine light stabilizers (HALS), but the present invention is not limited thereto. IRGANOX® is a registered trademark of Ciba Specialty Chemicalas Corporation (Tarrytown, N.Y.).

The UV-absorbers can be based upon any suitable UV-absorber. The UV-absorbers reduce or retard the effect of photooxidation by absorbing UV light that would otherwise result in the production of free radicals by breaking chemical bonds of other components of the composition. The UV-absorbers can include a reactive functional group, such as a hydroxyl group, to react with and chemically bond the UV-absorbers to the composition (e.g., the polyurethane polymer). In some embodiments, the UV-absorbers do not include a reactive functional group and/or do not react with and bond to the composition. Examples of the UV-absorber include any of the TINUVIN® UV-absorbers, but the present invention is not limited thereto. TINUVIN® is registered trademark of Ciba Specialty Chemicals Corporation (Tarrytown, N.Y.).

One embodiment of the composition includes a polyether diol, a low molecular weight polyester diol having low Tg (e.g., a Tg of about 22° C.), two distinct short chain diols as chain extenders, such as butane diol and ethylene glycol, and an aliphatic isocyanate. Another embodiment of the composition includes a polyether diol, a low molecular weight polyester diol having a relatively higher Tg (e.g., a Tg of about 33° C.), a short chain diol, such as butane diol, and an aliphatic isocyanate.

According to other embodiments of the invention, a composition includes an isocyanate (e.g., an aliphatic or aromatic isocyanate), a polyether diol, a branched short chain diol, and a cross-linker having a hydroxyl functionality greater than 2.0 (e.g., in a range of 2.2 to 4). The polyether diol can have a high molecular weight, such as a molecular weight equal to or greater than about 2900 g/mol. According to this embodiment, the functionality of the cross-linker and the amount of the cross-linker included in the composition should be high enough to provide a composition having suitable clarity, while still being low enough to provide a composition that can be used in an interlayer. If the functionality of the cross-linker is too high or the cross-linker is included in too high of an amount, a film including the composition cannot function as an interlayer, as the film cannot be heat activated to adhere to one or more substrates.

The branched short chain diol can have a backbone including carbon atoms in a range of 2 to 9 (e.g., a $C_2$-$C_9$ backbone). In some embodiments, the branched short chain diol has 1 to 4 branching groups (e.g., 1 to 4 pendant groups bonded to the backbone of the diol). Each of the branching groups can include from 1 to 4 carbon atoms (e.g., $C_1$-$C_4$ branches). An example of the branched short chain diol includes ethyl-butyl propane diol, but the present application is not limited thereto.

When the composition includes short chain branched diols, the hard segment can be included in amounts up to 70% without causing haze and while maintaining good flexibility. Incorporating and increasing the amount of these short chain diols in the composition (e.g., a TPU system) provides a composition having average performance at cold temperatures (e.g., temperatures in a range of about −40° F. to about −20° F.) and good performance at higher temperatures (e.g., temperatures in a range of room temperature to about 145° F.). For example, the branching of the branched short chain diol interferes with the hydrogen bonding between polymer chains of the composition, thereby improving the flexibility of the composition. For example, the branching of the branched short chain diols can reduce the amount of hydrogen bonding between urethane and ester linkages between separate polymer chains, or even within a polymer chain. The composition according to the above-described embodiment can include additives, such as those described above and, therefore, further description of the additives will be omitted.

An embodiment of the composition includes a polyether diol, a branched short chain diol (e.g., ethyl-butyl propane diol) as a chain extender, a medium molecular weight triol as a cross-linker and an aliphatic isocyanate. A composition according to that embodiment can have a Tg of about 16° C. Compositions that include both a high molecular weight polyether polyol (e.g., a polyether polyol having a weight average molecular weight of about 2900 g/mol) and a branched short chain diol as a chain extender are suitable for cold temperature applications due to the amount of hard segment included in the composition.

The composition can be formed according to the following embodiment. The raw materials that are solid at room temperature can be melted in an oven at high temperature to form molten ingredients. The molten ingredients and liquid ingredients, including additives, can be charged into a jacketed reactor such that the molten ingredients remain molten. A small amount (e.g., less than 0.05 weight percent) of a silane can optionally be added as an adhesion promoter. Examples of the silane include all types of amino and/or epoxy silanes, or combinations thereof, but the present invention is not limited thereto. The ingredients can be mixed until homogeneous. The batch should remain clear throughout the process. The isocyanate can then be added at a temperature in a range of, for example, about 100° F. to about 120° F. The mixture can then be mixed for a time period in a range of, for example, about two to three minutes. The catalyst can then be added, and the batch can be mixed for a time period in a range of, for example, about one to two minutes. The mixing can then be stopped and the batch can be transferred into containers and moved into ovens for curing.

The composition can then be cured under conditions discernible by those of ordinary skill in the art. For example, the composition can be cured at a temperature of about 200°

F., but the present application is not limited thereto. The composition can be cured for a time period of, for example, about 72 hours, but the present application is not limited thereto. After curing (e.g., after the cure cycle is complete), the composition can be cooled to room temperature to form blocks including the composition. Once the reaction is completed, the cured composition can be shipped in containers for grinding and extrusion. For example, the cured blocks can be cut, chopped and/or ground into granules to make the material suitable to use in an extrusion process. The granules can then be extruded (e.g., extruded through a single extruder machine) to form a cured sheet, which can then be used in any suitable manner depending on the intended application. For example, the cured and extruded films can be used as an interlayer and can be laminated between two substrates to make, for example, a window or other transparency.

The films can be extruded to have any suitable thickness, length and width. A film including the composition can have a $T_g$ in a range of about 16° C. to about 33° C. When the film is used an interlayer on a substrate (or between substrates), the interlayer can maintain adhesion to a variety of substrates even at extreme temperatures. For example, interlayers according to embodiments of the invention can be used for commercial and military aircraft transparencies (e.g., windshields, windows, and canopies), transportation (e.g., bus and train windows and windshields), transparent armor (e.g., ballistic glass), windows of buildings (e.g., bank, jewelry store, jail and prison windows), safety (e.g., police shields and visors), and other security applications. The foregoing applications benefit from interlayers that, when combined with a transparent, rigid substrate, provide a transparency having clarity, flexibility and low haze. When used as interlayers for ballistic glass, the films may be relatively thinner than in other applications so that the rigid substrate of the ballistic glass can be made thicker. For example, a film for an interlayer for ballistic glass can have a thickness in a range of about 0.015 inches to about 0.025 inches. When used as an interlayer for an aircraft cockpit canopy, windshield, or window, the film can have a thickness in a range of about 0.025 inches to about 0.050 inches.

As described above, the composition according to embodiments of the invention can be used to form an interlayer (e.g., a cured sheet) including the composition. Interlayers according to embodiments of the invention can be applied to a substrate (e.g., a transparent substrate) and/or between substrates to laminate or fuse two, three or more substrates (e.g., transparent and/or rigid substrates) together under heat or pressure. The substrates may be the same or different from one another. Examples of the rigid substrates include glasses, stretched or cast acrylics, polycarbonates and polyurethanes, such as OPTICOR®, which may be obtained from PPG Industries Ohio Inc. (Cleveland, Ohio). OPTICOR® is a trademark of PPG Industries Ohio Inc. For example, the polyurethane of the substrate may be any polyurethane set forth in U.S. Patent Application Publication No. 2009/0280329 A1, the entire contents of which are incorporated herein by reference.

FIG. 1 is a partially exploded cross-sectional view of a transparency 100 that includes an interlayer 110 laminated onto a transparent, rigid substrate 120. In FIG. 1, the interlayer 110 includes the composition (e.g., polyurethane polymer) according to embodiments of the invention. Although not shown in FIG. 1, the transparency 100 can further include a primer between the interlayer 110 and the substrate 120 to enhance adhesion between the interlayer and the substrate (e.g., a glass, a stretched or cast acrylic, a polycarbonate or a polyurethane, such as OPTICOR®). Any suitable primer can be used, such as any silane based or chlorinated type primers can be used. For example, polymeric silane based primers, such as FX-456, available from PPG Aerospace (Sylmar, Calif.), provide good adhesion between the interlayer and the substrate.

Figure 2:
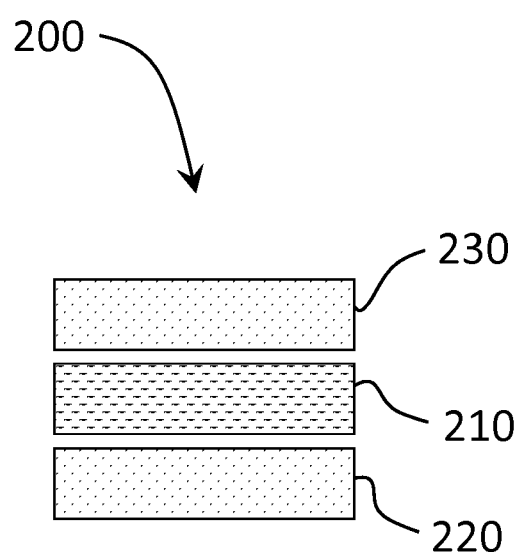
FIG. 2 is a partially exploded cross-sectional view of another embodiment of a transparency.

FIG. 2 is a partially exploded cross-sectional view of a transparency 200 that includes an interlayer 210 laminated between a transparent, rigid substrate 220 and a second transparent, rigid substrate 230. In FIG. 2, the interlayer 210 includes the composition (e.g., polyurethane polymer) according to embodiments of the invention. Although not shown in FIG. 2, the transparency 200 can further include a primer between the interlayer 210 and the substrate 220, and/or a primer between the interlayer 210 and the second substrate 230. The substrates can be, for example, glasses, stretched or cast acrylics, polycarbonates or polyurethanes, such as OPTICOR®.

Figure 3:
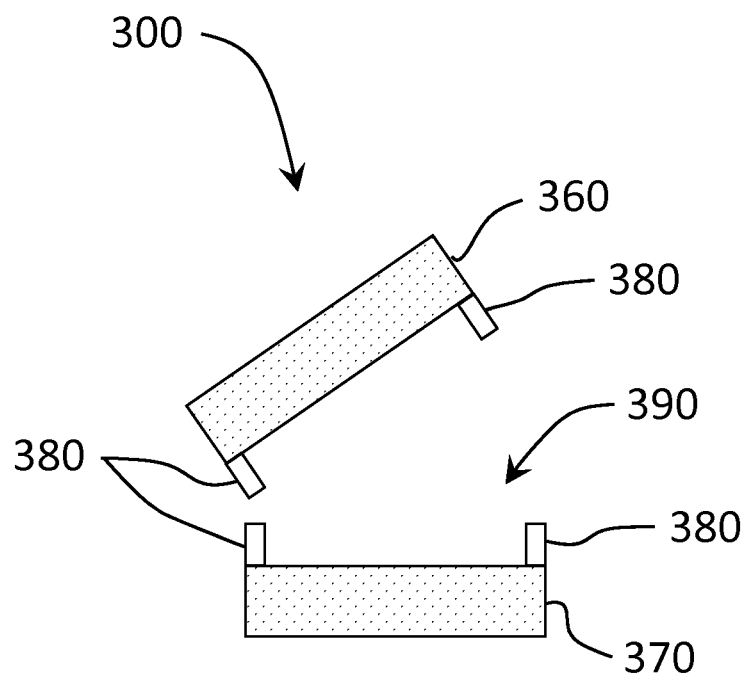
FIG. 3 is a partially exploded cross-sectional view of a partially formed transparency according to the related art.

FIG. 3 is a partially exploded cross-sectional view showing some of the components of a partially prepared transparency 300 during the preparation of the transparency according to a method in the related art. According to that method, a substrate 360 (e.g., polycarbonate) and a substrate 370 (e.g., polycarbonate) are fitted with spacers 380. The substrates are then combined together to form a space 390 between the substrates. The space 390 is then filled (or partially filled) with a liquid two-component interlayer precursor for preparing an interlayer. After the space 390 is filled with the interlayer precursor, the substrate 360 and the substrate 370 are aligned and pressed together, and the interlayer precursor is cured to form an interlayer. As the interlayer cures, air bubbles often form in the interlayer, which can degrade the optical characteristics (e.g., optical defects) of the resultant transparency. If the transparency is subsequently shaped (e.g., curve or bent) to form a cockpit canopy (e.g., a canopy for an F-15, F-18, or F-22 aircraft), windshield, window, or other curved transparency, the negative effects of the air bubbles can be increased as the shaping increases the area of each air bubble, thereby increasing the impact of each air bubble on the optical characteristics of the transparency. In contrast, interlayers according to embodiments of the invention can avoid or reduce the above-described problems, as the interlayers are formed by curing the composition and extruding the cured composition (e.g., the polyurethane polymer) into a film prior to laminating the interlayer onto the substrate(s). Accordingly, a transparency prepared according to embodiments of the invention has improved optical characteristics as compared to a transparency prepared according to the related art. Transparencies according to embodiments of the invention may be suitable for use as, for example, a canopy for an F-15, F-18, or F-22 aircraft.

Figure 4:
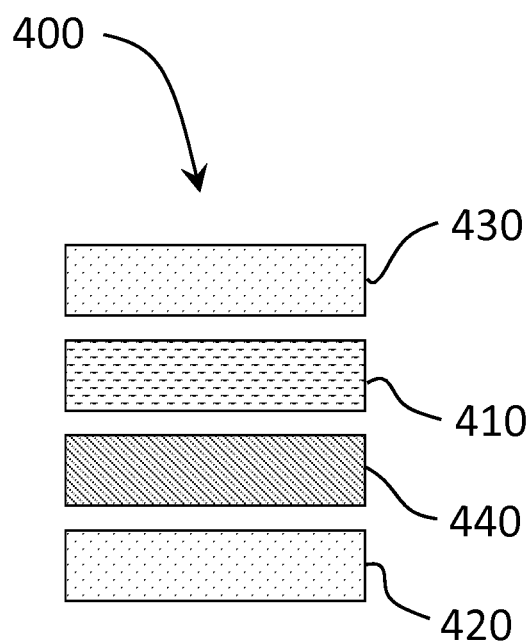
FIG. 4 is a partially exploded cross-sectional view of another embodiment of a transparency.

FIG. 4 is a partially exploded cross-sectional view of a transparency 400 including a primer 440. As shown in FIG. 4, the transparency 400 includes an interlayer 410 laminated between a transparent, rigid substrate 420 and a second transparent, rigid substrate 430. In FIG. 4, the interlayer 410 includes the composition (e.g., polyurethane polymer) according to embodiments of the invention. The transparency 400 includes the primer 440 between the interlayer 410 and the substrate 420. As described herein, the primer can be any suitable compound or layer that provides or improves adhesion between an interlayer including the composition according to embodiments of the invention and a substrate (e.g., glasses, stretched or cast acrylics, polycarbonates and polyurethanes, such as OPTICOR). For example, the primer can be a polymeric silane based primer, such as FX-456, available from PPG Aerospace (Sylmar, Calif.), but the present invention is not limited thereto.

Figure 5:
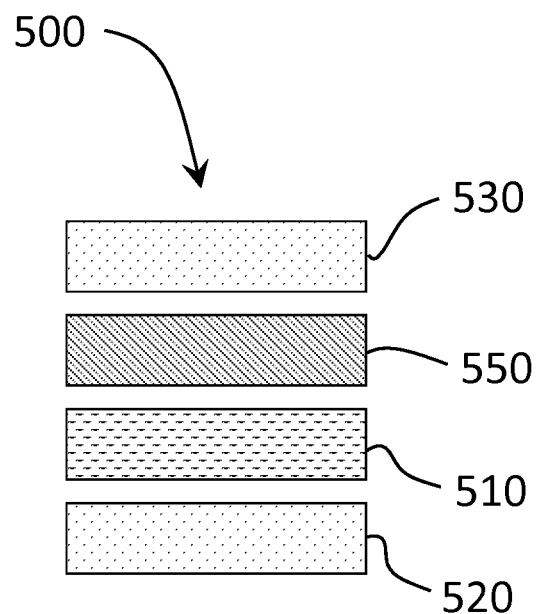
FIG. 5 is a partially exploded cross-sectional view of yet another embodiment of a transparency.

FIG. 5 is a partially exploded cross-sectional view of a transparency 500 including a primer 550. As shown in FIG. 5, the transparency 500 includes an interlayer 510 laminated between a transparent, rigid substrate 520 and a second transparent, rigid substrate 530. In FIG. 5, the interlayer 510 includes the composition (e.g., polyurethane polymer) according to embodiments of the invention. The transparency 500 includes the primer 550 between the interlayer 510 and the second substrate 530.

Figure 6:
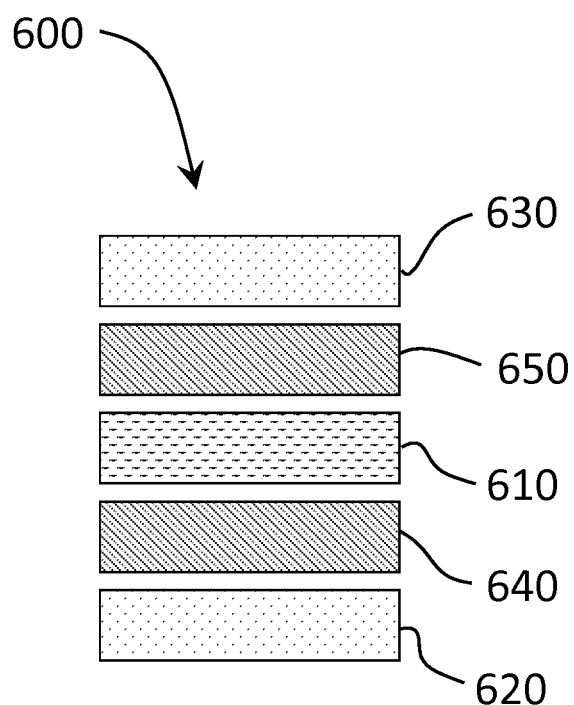
FIG. 6 is a partially exploded cross-sectional view of still another embodiment of a transparency.

FIG. 6 is a partially exploded cross-sectional view of a transparency 600 including a primer 640 and a second primer 650. As shown in FIG. 5, the transparency 600 includes an interlayer 610 laminated between a transparent, rigid substrate 620 and a second transparent, rigid substrate 630. In FIG. 6, the interlayer 610 includes the composition (e.g., polyurethane polymer) according to embodiments of the invention. The transparency 600 includes the primer 640 between the interlayer 610 and the substrate 620. The transparency also includes the primer 650 between the interlayer 610 and the second substrate 630.

Figure 7:
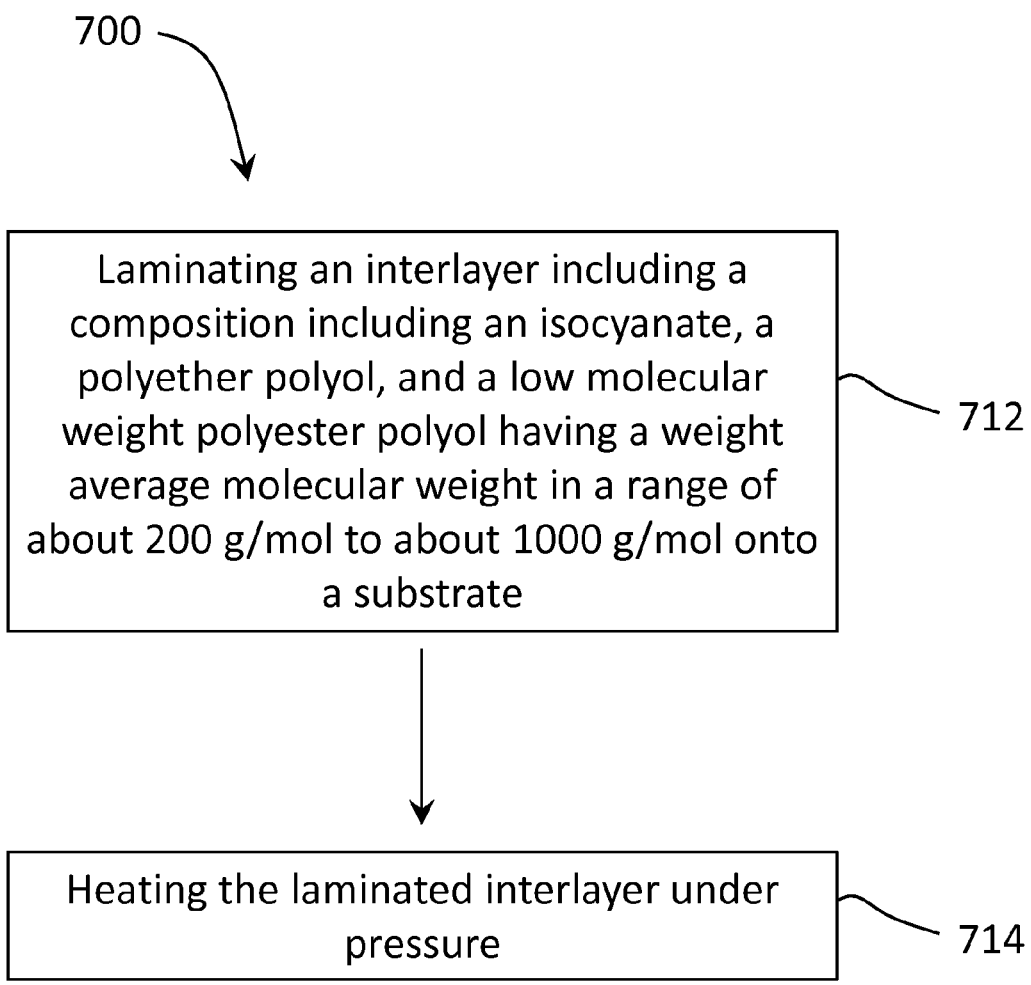
FIG. 7 is a flowchart illustrating an embodiment of a method of making a transparency.

FIG. 7 is a flowchart illustrating a method of making a transparency according to embodiments of the invention. In FIG. 7, a method 700 includes (712) laminating an interlayer including a composition including an isocyanate, a polyether polyol, and a low molecular weight polyester polyol having a weight average molecular weight in a range of about 200 g/mol to about 1000 g/mol onto a substrate. The method further includes (714) heating the laminated interlayer. As described above, the methods described herein, such as method 700, can avoid or reduce the problems associated with the formation of air bubbles in the methods of the related art. Accordingly, transparencies prepared according to the method 700 may exhibit improved optical characteristics as compared to transparencies prepared according to the related art. For example, transparencies prepared according to the methods described herein have exhibited typical light transmittance of greater than 90% and haze of less than 5%

According to embodiments of the invention, the interlayers can have a $T_g$ in a range of about −15° F. to about 22° F. Ballistic glass prepared with those interlayers were tested according to the military specification MIL-STD-662F. The ballistic glass passed qualification testing at relatively higher temperatures (e.g., 145° F. or 63° C.). For example, when shot twice at those temperatures and at about room temperature, the ballistic glass retained its integrity and prevented the projectile from penetrating through the ballistic glass. When used in ballistic glass, interlayers having a $T_g$ within the above-described range typically fail at temperatures below the $T_g$. It is expected that interlayers having a $T_g$ either higher or lower than the preceding range can be prepared according to embodiments of the invention. For example, it is expected that raising the $T_g$ of the polyether polyol of the composition (e.g., raising the $T_g$ above a temperature of about −86° F.) will raise the $T_g$ of the composition as a whole. In some ballistic glass applications, for example when used as an armor-grade transparency of a ground vehicle, such as the windshield or windows of an HMMWV ("HUMVEE®"), an interlayer having a $T_g$ of about −40° F. may exhibit desirable performance. HUMVEE® is a registered trademark of AM General, LLC. It is expected that by varying the $T_g$ of the polyether polyol, an interlayer having a $T_g$ of about −45° F. can be prepared according to embodiments of the invention.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. Throughout the text and claims, use of the word "about" reflects the penumbra of variation associated with measurement, significant figures, and interchangeability, all as understood by a person having ordinary skill in the art to which this invention pertains. Additionally, throughout this disclosure and the accompanying claims, it is understood that even those ranges that may not use the term "about" to describe the high and low values are also implicitly modified by that term, unless otherwise specified.

What is claimed is:

1. A film obtained from a composition comprising:
   an isocyanate;
   a polyether diol having a molecular weight of 2900 g/mol or greater;
   a branched short chain diol having a backbone including carbon atoms in a range of 1 to 9, and at least one branching group; and
   a cross-linker having a hydroxyl functionality in a range of 2.2 to 4,
   wherein the film having a glass transition temperature in a range of about 16° C. to about 33° C.

2. The film of claim 1, wherein the branched short chain diol comprises one to four branching groups having from 1 to 4 carbon atoms.

3. The film of claim 1, wherein the at least one branching group comprises 1 to 4 branching groups.

4. The film of claim 1, wherein the at least one branching group has 1 to 4 carbon atoms.

5. The film of claim 1, wherein the branched short chain diol comprises ethyl-butyl propane diol.

6. An interlayer, comprising the film according to claim 1.

7. A transparency, comprising:
   a transparent, rigid substrate; and
   the interlayer of claim 6 on the transparent, rigid substrate.

8. The transparency of claim 7, wherein the transparent, rigid substrate includes a material selected from the group consisting of glasses, polycarbonates, casted acrylics, stretched acrylics, and polyurethanes.

9. The transparency of claim 7, further comprising a primer layer between the interlayer and the transparent, rigid substrate.

10. The transparency of claim 7, further comprising a second transparent, rigid substrate, wherein the interlayer is between the transparent, rigid substrate and the second transparent, rigid substrate.

11. The transparency of claim 10, wherein the second transparent, rigid substrate comprises a material different from a material of the transparent, rigid substrate.

12. The transparency of claim 10, further comprising a primer layer between the interlayer and the second transparent, rigid substrate.

* * * * *